(12) United States Patent
Broberg

(10) Patent No.: US 8,493,434 B2
(45) Date of Patent: Jul. 23, 2013

(54) ADAPTIVE HDMI FORMATTING SYSTEM FOR 3D VIDEO TRANSMISSION

(75) Inventor: David K. Broberg, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 919 days.

(21) Appl. No.: 12/502,434

(22) Filed: Jul. 14, 2009

(65) Prior Publication Data
US 2011/0012990 A1    Jan. 20, 2011

(51) Int. Cl.
*H04N 13/00* (2006.01)
(52) U.S. Cl.
USPC .......................................................... 348/43
(58) Field of Classification Search
USPC ............. 348/25–172, 384.1–440.1, 699–702, 348/818–843
IPC ..................... H04N 3/02,3/36, 3/40, 5/14, 5/20, H04N 5/30, 5/33, 5/38, 5/64, 5/65, 5/72, H04N 5/89, 5/225, 5/253, 5/257, 5/335, 5/665, H04N 7/00, 7/12, 7/14, 7/18, 9/10, 9/11, H04N 9/43, 9/47, 9/64, 9/74, 11/00, 11/02, H04N 11/04, 13/00, 13/04, 15/00; A61B 1/04, A61B 1/06; G01S 15/89; G09B 9/00
See application file for complete search history.

(56) References Cited

U.S. PATENT DOCUMENTS

| | | | | |
|---|---|---|---|---|
| 2004/0218269 A1* | 11/2004 | Divelbiss et al. | ............. | 359/464 |
| 2006/0132473 A1* | 6/2006 | Fuller et al. | .................... | 345/204 |
| 2007/0186015 A1 | 8/2007 | Taft et al. | | |
| 2008/0195923 A1 | 8/2008 | Masumori | | |
| 2008/0303745 A1 | 12/2008 | Tseng et al. | | |
| 2009/0027405 A1 | 1/2009 | Kaga | | |
| 2009/0193490 A1* | 7/2009 | Stone et al. | .................... | 725/151 |
| 2010/0289872 A1* | 11/2010 | Funabiki et al. | ................ | 348/43 |

OTHER PUBLICATIONS

TDVision Systems, Inc., "Enabling 3D HD Video for Massive Adoption At the Best Quality Providing 2D Compatibility", Version 2.4, Jan. 2009, publication date unconfirmed, 15 pages.
TDVision Video Codec (TDVCodec) 2D+Delta, publication date unconfirmed, 1 page.
TDVision Systems, Inc., "Enabling 3D HD Video for Massive Adoption Providing 2D Compatibility", Version 2.1, Aug. 2008, publication date unconfirmed, 14 pages.
TDVision Systems, Inc., "Enabling 3D HD Video for Massive Adoption Providing 2D Compatibility", Version 2.3, Aug. 2008, publication date unconfirmed, 13 pages.

* cited by examiner

*Primary Examiner* — Jay Patel
*Assistant Examiner* — Jessica Prince
(74) *Attorney, Agent, or Firm* — Great Lakes Intellectual Property, PLLC.

(57) ABSTRACT

A system configured to support video formatting without a priori knowledge of video formatting requirements of a display device. The system relies on video information transmitted from the display device to a source device to facilitate determining the video formatting requirements of the display device. The system can be used within any television network, gaming network, and content sourcing network where it may be advantageous to deploy a source device that can support formatting requirements for a plurality of different display types.

7 Claims, 2 Drawing Sheets

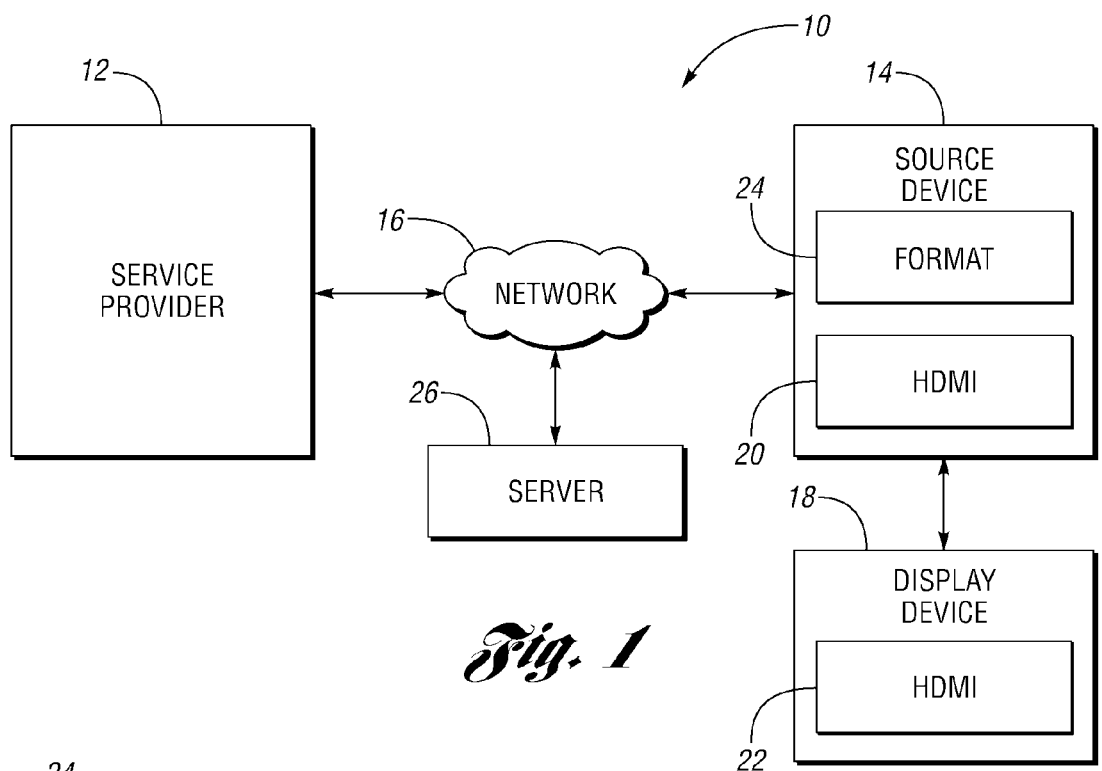

ADAPTIVE HDMI FORMATTING SYSTEM FOR 3D VIDEO TRANSMISSION

BACKGROUND OF THE INVENTION

1. Technical Field

The present invention relates to formatting video according formatting requirements of a display device, such as but not limited formatting 3D video according to an optimal 3D video format associated with the display device.

2. Background Art

A High-Definition Multimedia Interface (HDMI) connection provides for uncompressed delivery of digital video content between a source device and a display device that conform to published specifications and standards. The existing standards (CEA-861E) and specifications (HDMI v1.3), however, provide for a wide range of video formats, e.g., standard definition (SD) and high definition (HD) at various picture sizes and frame rates. Because there are plethora of video transmission options that operate within the boundaries of the existing standards and specifications, the display devices are not necessarily restricted or otherwise configured to operate with a specific one of the options—there is no specific requirement for the carriage of video content between the source device and the display device. The video formatting requirements of the output devices, therefore, are decided by the manufacturers and tend to vary from one manufacturer to another.

For example, one manufacturer may use an over/under coding for 3D video where the separate left and right video images are packed into a single video frame with the left frame over the right frame, but squeezed into a single video frame. The video signals on the interface are fully compliant in every way with the existing standard except the source and display devices must some how understand that for 3D content the first (upper) half of the video frame will be used for the "left-eye" image while the second (lower) half of the video frame will be used for the "right eye" image. As long as the exchange is understood and used in the same way by both of the source and display devices, compatibility is provided. Other manufacturers may use a similar scheme, but choose to place the left and right images side-by-side within a single frame. Still others alternate lines, pixels or frames between left and right source images. In addition to the spatial division and placement of the separate left and right signals, other techniques can be used, including inversion or mirroring of one signal versus the other.

Manufacturers deploying display devices are taking advantage of existing video formatting modes of the HDMI connection but with a private or a priori knowledge of the formatting requirements of the display device. In other words, the manufacturers are relying on the source device to have prior knowledge of the formatting requirements of the display device such that the source device can be deployed with the same design principles as the display device. As a result, even though a multitude of different and incompatible choices are possible, interoperability between the source device and display device is only possible between products designed according to the same formatting principals.

In environments where source devices are commonly deployed to subscribers or other locations where the formatting requirements of the display devices is unknown or not necessarily the same for each display device, there is a possibility of format incompatibility between the source device and the display device.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates an adaptive HDMI formatting system for 3D video transmission in accordance with one non-limiting aspect of the present invention;

FIG. 2 illustrates a formatting table in accordance with one non-limiting aspect of the present invention;

DETAILED DESCRIPTION

Figure 3:
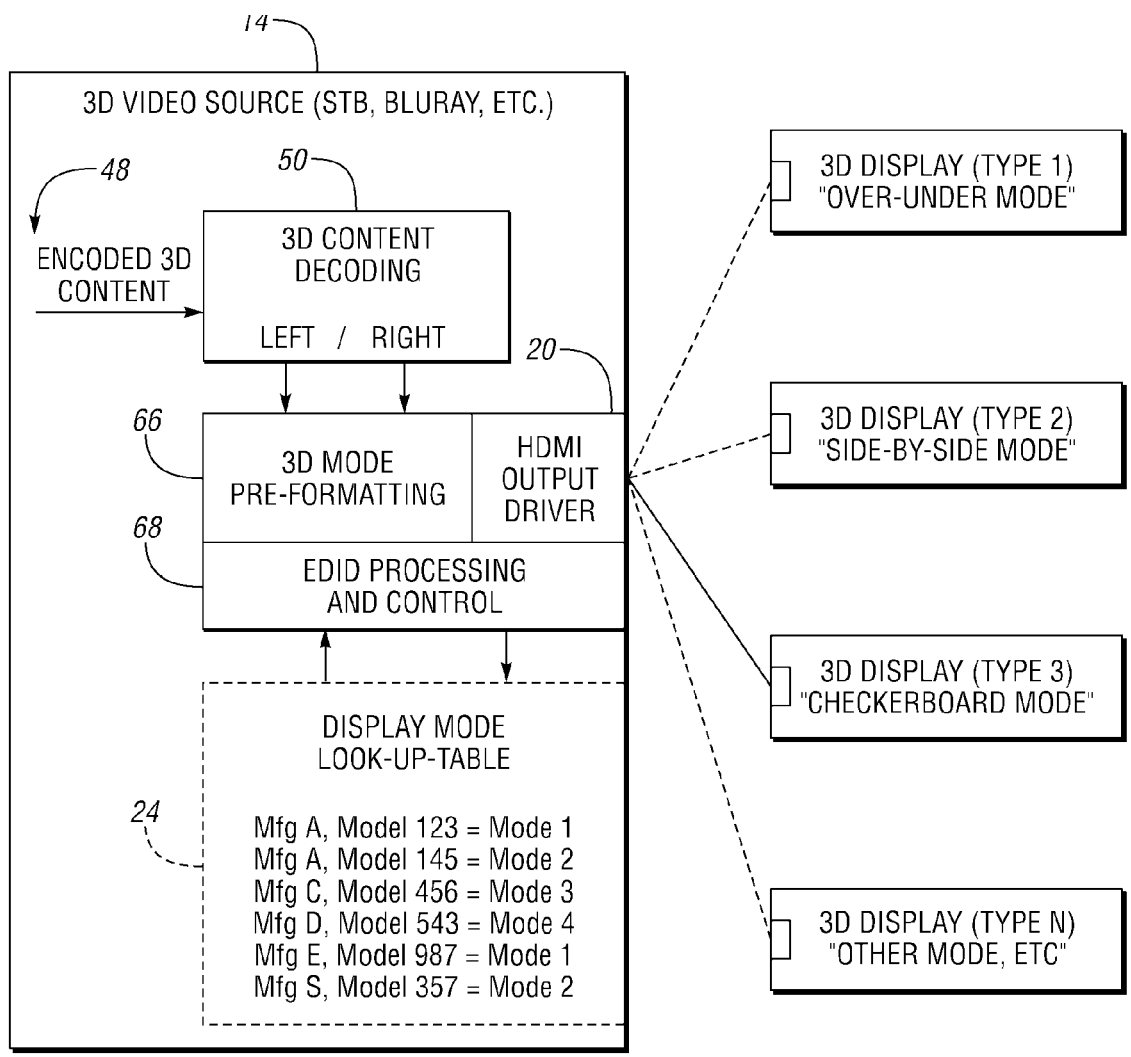
FIG. 3 illustrates a source device in accordance with one non-limiting aspect of the present invention.

FIG. 1 illustrates an adaptive HDMI formatting system 10 for 3D video transmission in accordance with one non-limiting aspect of the present invention. The system 10 may be configured to support the transmission of 3D video from a service provider 12 to a source device 14 located at a subscriber location. The source device 14 may be configured to format signals received from the service provider 12 over a network 16 to support output of 3D video to a display device 18 by way of HDMI ports 20, 22 used to support an HDMI connection between the source and display devices 14, 18. While the present invention is predominately described with respect to relying on an HDMI connection between the source device 14 and the display device 18 to facilitate formatting 3D video, the present invention is not intended to be so limited and fully contemplates formatting the signals for output as 2D video and according to other protocols.

3D video can be formatted according to a number of 3D formatting modes depending on a display type of the display device 18. For example, one display type may rely on an over-under formatting mode where separate left and right video images are packed into a single video frame with the left frame over the right frame within a single video frame. Another display type may rely on a side-by-side formatting mode where separate left and right video images are packed into a single video frame with the left frame being side-by-side with the right frame within a single video frame. Yet another display type may rely on a checkerboard formatting mode where left and right video images are dispersed throughout a single video frame. There are numerous display types that may rely on numerous formatting modes.

One non-limiting aspect of the present invention contemplates supporting virtually any display type with the source device 14 and without any a priori knowledge of the display type of the display device 18. In this manner, the present invention contemplates deployment of the source device 14 without the source device 14 having any knowledge of the display type or formatting requirements of the display device 18 before being connected to the display device 18. The present invention contemplates accomplishing this with a means for retrieving formatting requirements of the display device 18, such as but not limited to the use of a formatting table 24 included within the source device 14 or included on a server 26 or other device in remote communication with the source device. The formatting table 24 may be configured to associate display types with any number of display devices 18 based on an identifier associated with the display device 18 so that the formatting mode for any display type can be determined from the display identifier.

FIG. 2 illustrates the formatting table 24 in accordance with one non-limiting aspect of the present invention. The formatting table 24 may include a first column 28 of display identifiers that identify any of a possible number of display devices 18. A second column 30 may be included to list display types for each of the display identifiers 28 and their corresponding display requirements, i.e., over-under, checkerboard, side-by-side, etc. In the event new display devices are deployed, additional entries can be added to the table 24 to detail the display types and associated formatting modes. The display types are shown with respect to various 3D formatting modes for exemplary purposes and without intending to limit the scope and contemplation of the present invention. Any other type of formatting requirement and other operation requirements not otherwise known from information passed by display device 18 may be included within the table 24, including information related to 2D formatting modes for display devices that are not 3D ready.

To facilitate identifying the display identifier 28 of the display device 18 to be cross-referenced with the formatting table 24, one non-limiting aspect of the present invention contemplates the use of the HDMI connection to exchange information between the source device 14 and the display device 18 in a manner that facilitates assessment of the formatting requirements of the display device 18. Specifically, existing HDMI protocol requires an exchange of Extend Display Identification Data (EDID) information upon establishment of the HDMI connection between the source 14 and display 18 devices. The EDID is a standard published by the Video Electronics Standards Association (VESA) used by the display device 18 to advertise its capabilities to the source device 14 according to a commonly understood data format.

The EDID information may be embedded within a memory (not shown) of the display device 18 at the time of manufacture to identify a manufacturer name, product description or type, phosphor or filter type, timings supported by the display, display size, luminance data, 2D formatting requirements, and pixel mapping data (720i, 720p, 1080i, 1080p, etc.). The EDID information, however, does not identify the formatting requirements of the display device 18 with respect to 3D video and other information that may be specified within the formatting table 24. The present invention addresses this issue by cross-referencing one or more pieces of EDID information with the 3D video formatting requirements of the display type 30. This may include the source device 14 relying on the EDID information passed from the display device 18 to uncover the corresponding display identifier within the table 24, and from there, the 3D formatting mode required for that display type.

As illustrated in FIG. 2, the formatting table 24 may rely on the vendor name and product description fields defined by the EDID protocol to generate a display identifier 28 for each display device 18. In particular, an InfoFrame type 0x03 as defined by the EDID standard, which includes vendor name and product description fields, may be used as the display identifier 28 within the formatting table 24. This non-specific nomenclature for uniquely identifying the display type 30 from information already included within the EDID messages can be advantageous in that it does not require a unique identifier to be stored on the display device 18 and it allows the table to be easily updated to include new display types as newer display and formats become available. Reliance on a serial number or another type of individually specific reference designation to be embedded within the display device 18 may be more difficult to support since it would require a much larger table to list each of the unique numbers and some type of feedback system to continuously associate each new serial number with a 3D format within the table 24. Other display identifiers, however, can be used without deviating from the scope and contemplation of the present invention, including storing unique display identifiers within the display device 18.

FIG. 3 illustrates a configuration for the source device 14 contemplated by one non-limiting aspect of the present invention to facilitate adaptive 3D video formatting from EDID information transmitted from the display device 18 in accordance with HDMI transmission protocols. The source device 14 may be any device configured to receive a content stream 48 from the service provider 12 or other content source, such as but not limited to a satellite source, ATSC source, cable television source, IPTV source, video game console, STB, BluRay player etc., for formatting prior to output to the display device 18.

The output device 14 may include a 3D content decoding element 50 to recover left and right eye video frames used to support 3D viewing. Since 3D video typically requires the display of left and right eye video frames at a frequency sufficient for the mind to formulate a three dimensional representation, the left and right eye images may be output to the display device 18 as two separate signal streams, although one signal stream having combined image frames could be used. The display device 18 may include two tuners or other processors to process the left and right signal streams for output according to the particular 3D formatting mode (3D display type) employed by the display device 18.

Figure 4:
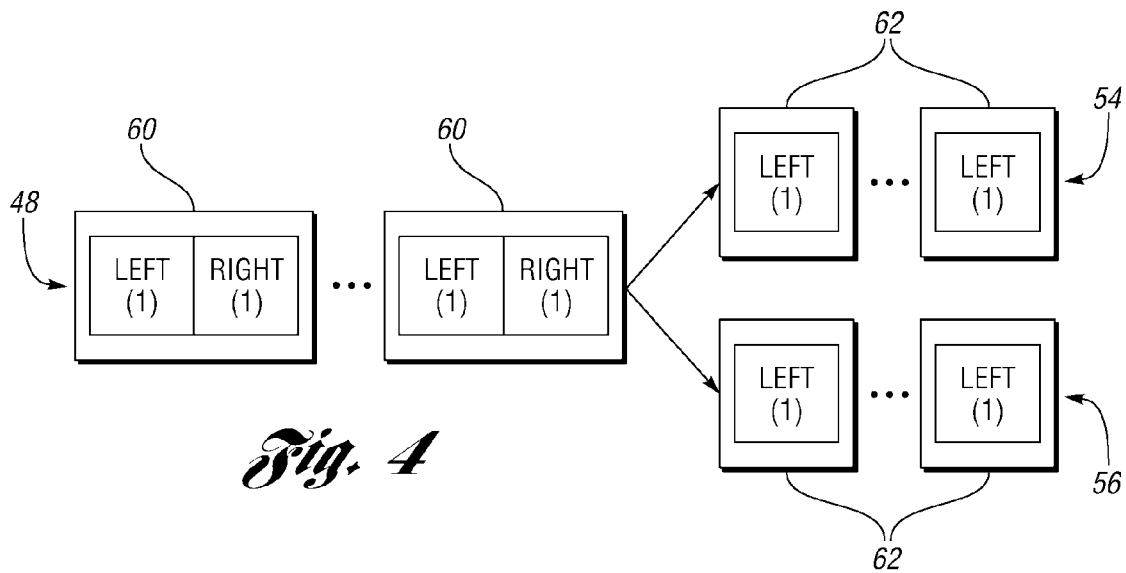
FIG. 4 illustrates a signal stream having left and right images combined into single frames and separation of the combined frames into single frames of left and right images.

To limit transmission costs, the left and right eye video frames may be transmitted to the source device 14 within a single video frame. As illustrated in FIG. 4, a single signal stream 48 may be provided to the source 14 and output as separate signal streams 54, 56 formatted according to the 3D requirements of the display device 18. The signal stream 48 may include a succession of combined image frames 60 in that each frame 60 has separate left and right images. The signal streams 54, 56 output to the display device 18 may include frames 62 comprised of single left and right images. The 3D content decoder 50 may be configured to recover the left and right images for use by a 3D pre-formatting element 66 in outputting the signal streams 54, 56 to be displayed by the display device 18.

The 3D mode pre-formatting element 66 may be configured to process the left and right eye video frames output from the 3D content decoding element 50 prior to output to the display device 18. The 3D mode pre-formatting element 66 may be configured to format the 3D video according to one of the 3D formatting modes noted above, i.e., the over-under formatting mode, the side-by-side formatting mode, the checkerboard formatting mode, or other formatting mode. The 3D mode pre-formatting element 66 may determine the appropriate 3D formatting mode based on the EDID information transmitted from the display device 18 upon establishment of the HDMI connection.

An EDID processing and controller element 68 may be included as part of the pre-formatting element 66 to facilitate the related processing and look-up within the formatting table 24. The 3D Mode pre-formatting element 66 may act upon the command signals from the EDID processing and control element 68 in order to rescale, invert, squeeze, filter or otherwise prepare the separate left and right pixels output from the 3D content decoding element 50 into the format needed by the display device. The HDMI output driver 20 may then be used to output the 3D video to the display device 18 according to the optimal 3D video format of the display device 18. In the event the display device 18 is not 3D ready, the pre-formatting element 66 may rely on 2D requirements specified by the EDID information to support output of 2D signals.

As supported above, one non-limiting aspect of the present invention relates to a system that dynamically modifies and reformats HDMI video output to support a plethora of 3D video formats by making use of a look-up-table of stored EDID information. This system can be used to provide the best-fit 3D video format for a wide range of 3D display types and configurations in an automated solution that universally adapts the output of the source device as needed to match the display device requirements. Alternately this information can be used with a simpler system to identify only those monitors that can accept a more limited range of or single type of 3D output format, while automatically reformatting the 3D content into 2D for non-compatible monitors.

Currently there are private 3D video formats being used over the HDMI interface to work with manufacturer specific 3D display technology. For example some use over-under formatting, some use side-by-side formatting, and others use checkerboard formatting to convey the separate left and right eye images necessary for 3D video. These private formats are not defined by current HDMI specifications. Current CEA standards (CEA-861) do not support signaling to identify these various proprietary formats. To solve the problem the source device needs a priori knowledge of the best mode for each possible 3D display. This can be accomplished by creating a database of tested monitors, indexing that database with the manufacturer unique brand/model number that is already carried in the EDID information and using a look up table to retrieve the best-format type when the device initializes. This system solves the interoperability problem without the need to change any interface standards.

The source device 14 is generally described as being connected to the display device 18, however, this is done for exemplary purposes only. The present invention fully contemplates the source device 14 being part of the display device 18 or otherwise integrated with it and/or the source device 18 being part of a headend unit or other device of the service provider 12.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing an optimal 3D video format without a priori knowledge of a 3D display type used by a display device, the method comprising:
    creating a table of optimal 3D video formats for a plurality of display devices, the table listing optimal 3D video formats according to vendor names and product descriptions associated with the plurality of display devices, the table listing an optimal 3D video format for each combination of vendor name and product description, the table having a non-specific nomenclature at least in that the optimal display formats are identified solely from the combinations of vendor names and product descriptions and without specifically identifying or listing unique identifiers for the corresponding display device;
    receiving Extended Display Identification Data (EDID) information from the display device, the EDID information identifying a vendor name and a product description of the display device;
    identifying an optimal 3D video format listed within the table for the display device solely as a function of the vendor name and product description included within the EDID information; and
    outputting 3D video from a source device to the display device according to the optimal 3D video format listed for the identified display type.

2. The method of claim 1 further comprising transmitting a request from the source device to a remote device to identify the optimal 3D video format in the event the table fails to list the vendor name and product description identified within the EDID information.

3. The method of claim 1 further comprising providing 2D video from the source device to the display device in the event the table fails to list an optimal 3D video format for the display device.

4. The method of claim 1 further comprising outputting the 3D video from the source device in separate left and right eye video frames, including recovering the left and right eye video frames from a single video frame having both of the left and right eye video frames.

5. The method of claim 1 further comprising outputting the 3D video according to the optimal 3D video format being one of an over-under mode, a side-by-side mode, and a checkerboard mode.

6. The method of claim 1 further comprising receiving the EDID information as at least part of an InfoFrame type 0x03 received through a High Definition Multimedia Interface (HDMI) included on the source device.

7. The method of claim 1 further comprising the EDID information being non-specific in that the EDID information does not include a serial number or other identifier individually unique to the display device, thereby resulting in the optimal 3D format being determined without individually identifying the display device.

* * * * *